Patented July 18, 1944

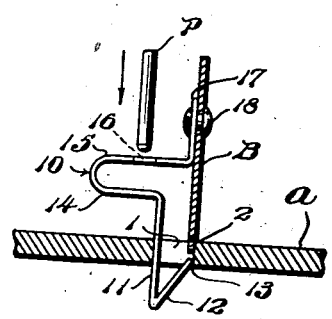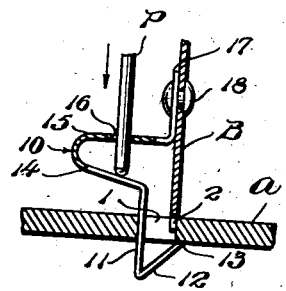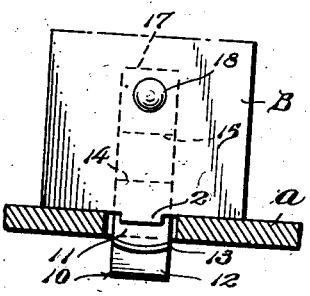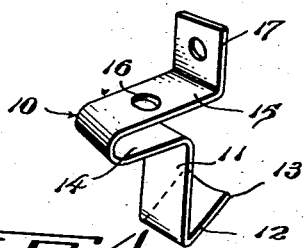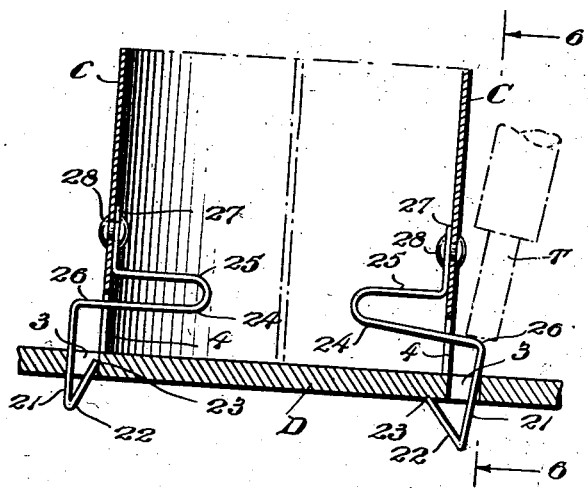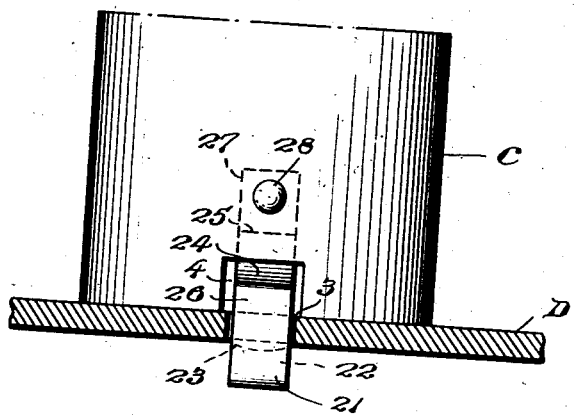

2,353,795

UNITED STATES PATENT OFFICE 2,353,795

LOCKING FASTENER

George A. Tinnerman, Cleveland, Ohio, assignor to Tinnerman Products, Inc., Cleveland, Ohio, a corporation of Ohio Original application November 20, 1940, Serial No. 366,472, now Patent No. 2,265,957, dated December 9, 1941. Divided and this application October 21, 1941, Serial No. 415,969

2 Claims. (Cl. 85—5)

This invention relates in general to improvements in fastening installations wherein an object or part is secured to an apertured support by a spring clip fastener involving a novel principle for providing a positive locked securing action thereof in applied fastening position. The present application is a division of prior copending application Serial Number 366,472 filed November 20, 1940, now Patent No. 2,265,957, issued December 9, 1941.

More particularly, the invention is directed to a spring clip fastener which may be constructed in different forms for various applications and uses, but in any case, is adapted to provide a positive locked securing action in a work aperture and otherwise reliably fasten the parts of an assembly under continuously effective spring tension against loosening or displacement even under extreme conditions of shock, vibratory motion, and the like.

The present invention involves an arrangement for fastening a member to a support by means of a clip on the member which may pass through an opening in the support and retain spring engagement therewith, the parts being so arranged that the mere positioning of the article on the support does not of itself complete the fastening action, and thus enables very accurate positioning of the parts before fastening is effected. Then when the clip is diverted from its normal position, its reaction causes it to obtain a spring hold on the support in the manner to lock the parts fixedly and rigidly together.

A principal object of the invention, therefore, is to provide an improved fastening means of this character which may be provided for various types of installations and embodying a clip shank construction that is intended to be forcibly applied to positive locked engagement in a work aperture following the assembly of the parts of the installation in exact, predetermined relation, and further, to secure the parts in such relation under continuously effective spring tension against loosening, displacement or disassociation.

A further object of the invention is to provide a spring fastener construction of the kind described comprising a clip shank or securing portion adapted to be forcibly applied to an aperture in a support, as aforesaid, an attaching portion for attaching the fastener to an object or part to be secured to said support, and a resilient, yieldable connecting portion joining said securing and attaching portions in a manner to permit the clip shank to be actuated generally axially to fastening position in said aperture and locked therein against withdrawal or reverse movement tending toward loosening or separation of the members of the assembly.

Another, more specific object of the invention is to provide various forms of such fastening means in the manner of simple, one-piece, sheet metal clip devices which are cheap and inexpensive to provide and lend themselves to economical quantity production in that they may be produced at relatively low cost from ordinary sheet metal strip stock with little loss or waste of material.

Further objects and advantages, and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a vertical sectional view of an installation in accordance with the invention embodying one form of the improved locking fastener shown in the initially applied position thereof for securing the installation;

Fig. 2 is a similar view showing the fastener in final applied position;

Fig. 3 is a side view looking from the right of Fig. 2, the support being represented in section; and, Fig. 4 is a perspective of the fastener per se shown employed in Figs. 1 to 3 inclusive.

Fig. 5 is a vertical sectional view of an installation for mounting a container, or the like, by another form of the improved locking fastener; and, Fig. 6 is a side view taken along line 6—6 of Fig. 5.

Referring now, more particularly, to the drawing, Figs. 1 to 3 inclusive, show a fastening installation of general utility in which any two cooperating parts A, B, may be secured in generally normal relation to each other by a simple, inexpensive form of the fastener such as shown in Fig. 4, for example. The part A represents the support which is usually in the form of a panel, or the like, and is provided with an opening 1 for receiving the shank or holding portion of the fastener as shown in Fig. 1. The part B designates the secured portion of any article or object to be fastened to the support A in generally normal relation thereto and locked against shifting, displacement or disassociation of said parts from assembled relation. If desired, said part B may be provided with a positioning lug or similar element 2 extending from the lower edge thereof as best seen in Fig. 3 and receivable in said opening 1 in the support in the predetermined assembled relation of said parts A, B.

Said opening 1, may be of round, rectangular or other suitable outline so long as it is of a size proportionate to the dimensions of the shank or holding portion of the fastener to provide for an interlocking relation thereof in said opening. In this respect, said positioning lug 2 is designed to be received in such round or rectangular opening in firm, rigid, engagement with a side wall thereof at the same time the holding shank also is received in said opening in the initial step of securing said parts A, B, as presently to be described.

The fastener in this form of the invention, designated generally 10, Fig. 4, is a simply formed, inexpensive device which may be constructed of any suitable sheet metal material, preferably spring metal or cold rolled metal having spring-like characteristics. The device may be formed from blanks of various outlines, of course, but from a quantity production standpoint, is most advantageously provided from a comparatively small, generally rectangular blank which may be obtained from ordinary sheet metal strip stock with little loss or waste of material.

The metal strip is provided of a width to be received in the opening 1 in the support and is bent to define a shank or holding portion comprising a leg 11 and tongue 12 or similar yieldable element integrally united therewith at the leading end thereof. The extremity of the tongue 12 presents a locking shoulder which normally lies a distance from said leg member 11 greater than the size of said opening 1 in the support and includes one or more anchoring points or teeth 13 provided thereon in any suitable manner. The substantial mid-portion of the strip adjacent said shank leg 11 is formed into a return bend defining a U-shaped connecting portion comprising spaced, generally parallel and relatively yieldable arms 14, 15, extending from said shank leg 11 in a direction opposed to said tongue or yieldable locking element 12. Said upper arm 15 preferably is formed with a tool recess 16 and the outer free end portion thereof bent to provide an attaching portion 17.

As shown in Fig. 1, the fastener thus provided is united to the part or object B through said attaching portion 17 by any suitable means such as rivets 18 or equivalent screws, welding, or the like, attaching means. The fastener otherwise is so attached to part B, that in the assembled relation thereof on part A, the leading end of shank leg 11 is received in the opening 1 without the extremity of the yieldable tongue element 12 passing through said opening. In this respect, the lower edge of part B firmly and rigidly rests upon the adjacent surface of the support and if the same includes the positioning lug 2, such lug also is received in said opening in engagement with the adjacent wall thereof. The shank leg 11 engages the opposite wall of said opening as the cooperating yieldable tongue element 12 is compressed toward said leg when received in said opening in the initial application of the fastener shank thereto, as shown in Fig. 1.

In this initial juxtapositioning of the parts A and B, they are disposed in their predetermined properly assembled relation with the lug 2 on the object occupying the opening 1 of the support, and the arm 11 and tongue 12 of the fastener also in the opening, before the locking shoulder defined by the extremity of the tongue has cleared the opening. When it does clear the opening, consequent upon the shoving down of the lower arm of the U bend, the engaging end 13 of the tongue springs into position beneath the support, as shown in Fig. 3, without changing the position of the lug 2, or the location of the arm 11 against the back of the opening.

The arm 15 of the U-shaped connecting portion of the fastener is more or less rigidly disposed with respect to part B by the attaching portion 17 while the cooperating relatively yieldable arm 14 carries the shank leg 11 in a manner whereby said shank may be easily and quickly actuated in a generally axial direction to project the tongue 12 thereof through the opening 1 in part B to substantially the position shown in Fig. 2. This can be effected by any suitable tool applied to the yieldable arm 14 but preferably by a device embodying a substantial pin P which may be passed through the tool recess 16 in the arm 15 and pushed against cooperating relatively yieldable arm 14 in such a manner that the shank leg carried thereby is easily and quickly actuated in a generally axial direction a distance sufficient for the extremity of tongue 12 to clear the opening. Said tongue 12 is thereupon free to spring outwardly to its normal untensioned relation wherein the extremity thereof extends beyond the edges of the opening and defines a shoulder adapted to positively engage the adjacent rearward face of the support A as shown in Fig. 2.

When said tool P is withdrawn and the attendant pressure removed from the arm 14 of the fastener, said arm attempts to assume its initial position carrying the shank 11 and tongue 12 therewith in a reverse axial direction. This forces the pointed prongs or anchoring teeth 13 on the tongue extremity to dig into locked embedded relation with the rearward face of the support under tension of said spring arm 14 and thereby prevent any loosening or displacement of the shank from applied fastening position in the opening.

Inasmuch as the lower edge of part B rests firmly upon the opposite upper face of the support A as shown in Fig. 3, such locked embedded relation of the anchoring teeth 13 under the continuously effective spring force of tensioned arm 14, serves also to minimize any possibility of slight shifting of said part B from its initially secured position on the support. In a further respect, if said part B includes the positioning lug 2 received in the opening 1 in the support, the shank leg 11 engages a wall of said opening and resiliently urges and maintains such positioning lug 2 in engagement with an opposite wall thereof, wherefore the part or object B is thus maintained against any possible shifting or displacement from its proper assembled relation on the support, while the installation otherwise is secured in a positive locking action by the shoulder defined by the extremity of tongue 12 or similar yieldable element, as aforesaid.

Removal of the fastener and disassociation of the parts of the assembly may be effected by applying a suitable tool to the tongue 12 at the rearward side of the support and compressing said tongue toward the shank leg 11 as necessary for the extremity thereof to be received in the opening 1, as shown in Fig. 1, whereupon the fastener shank or holding portion may be withdrawn from said opening and the secured part B easily and quickly separated from the support A.

Figs. 5 and 6 show a form of the locking fastener which is similar in operation and use to that just described and embodies an advantageous construction which is particularly suited for detachably securing a hollow container, or the like, to a supporting part without an unsightly or otherwise objectionable projecting relation of the fasteners externally of the container. In the present example, a condenser can C, of the type commonly used in radio apparatus, for instance, is shown positioned on the supporting panel D and provided with a plurality of spaced locking fasteners designed to be attached to the interior walls of the container with the shank legs 21 thereof extending outwardly of the container in position to be easily and quickly applied to correspondingly spaced openings 3 in said panel D.

The shank or holding portion of each such locking fastener includes a shank leg 21 having at one end a locking tongue 22 preferably provided with anchoring prongs or teeth 23 on the extremity thereof and defining a locking shoulder designed for operation and use in a manner similar to the form described with reference to Figs. 1 to 4, inclusive. Said shank is carried by a return bent, resilient, U-shaped connecting portion comprising spaced arms 24, 25, of unequal length positioned within the container. The longer arm 24 is a spring arm passing through a suitable slot 4 in the lower edge of the container, as best seen in Fig. 6, and defining an external abutment 26 against which any suitable tool, T represented in dotted lines Fig. 5, may be applied to actuate the shank of the fastener axially to final applied fastening position. The free end portion of the fastener adjacent arm 25 is bent to provide an attaching portion 27 which may be secured to the interior wall of the container by rivets 28 or equivalent screws, welding, or the like, attaching means.

The container is thus provided with fastening means in a manner whereby the same may be assembled on the supporting panel D with the shanks of the fasteners, as shown to the left in Fig. 5, being received in the openings 3 but without the extremities of the tongues 22 thereof passing through said openings. The container is thereby capable of being accurately and precisely positioned on the supporting panel prior to the operation by which the shanks of the fasteners are actuated to locked relation in the openings therein, as shown to the right in Fig. 5, upon application of the tool to the external abutment 26 of each fastener. In this relation, the locking action of the tongues 22, and the operation of the fasteners in general, is substantially similar to that described with reference to Figs. 1 to 3, inclusive, and inasmuch as the shank legs 21 are adapted to engage the respective outer walls of the openings 3 in opposing relation to each other, the container C or other similar object is fixedly and rigidly secured against any possible shifting or displacement from its proper assembled relation on the supporting panel, even under conditions of shock, vibratory motion, and the like.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

Reference is made to my divisional application No. 510,191, filed November 13, 1943, for claims directed to the embodiment illustrated in Figs. 5 and 6 hereof.

What is claimed is:

1. A locking fastener for securing an object or part to a supporting part through an opening in said supporting part, said object having a positioning lug receivable in said opening in engagement with a wall thereof, said fastener including a strip of metal having a bent portion providing a shank comprising a leg member and a locking element yieldable with respect thereto and defining a shoulder normally spaced from said leg member a distance greater than the size of said opening in the supporting part, and means connected to said shank adapted for attaching the fastener to the part to be secured to said supporting part, said shank in the assembled relation of said parts being receivable in the opening in the supporting part with the leg member thereof engageable with the wall of said opening at a point opposed to that engaged by said positioning lug on the part to be secured to said supporting part.

2. A locking fastener for securing an object or part to a supporting part through an opening in said supporting part, said fastener including a strip of metal having a bent portion providing a shank comprising a leg member and a locking element yieldable with respect thereto and defining a shoulder normally spaced from said leg member a distance greater than the size of said opening in the supporting part, and means connected to said shank adapted for attaching the fastener to the part to be secured to said supporting part, said shank in the assembled relation of said parts being receivable in the opening in the supporting part with the leg member thereof in engagement with one wall of the opening while the locking element engages the underside of the support beyond the opening, and a lug on the object entering a recess in the support to prevent the said leg member shifting into the unoccupied region of the opening.

GEORGE A. TINNERMAN.